Jan. 14, 1947.  O. J. POUPITCH  2,414,272
FASTENING DEVICE
Filed March 25, 1943
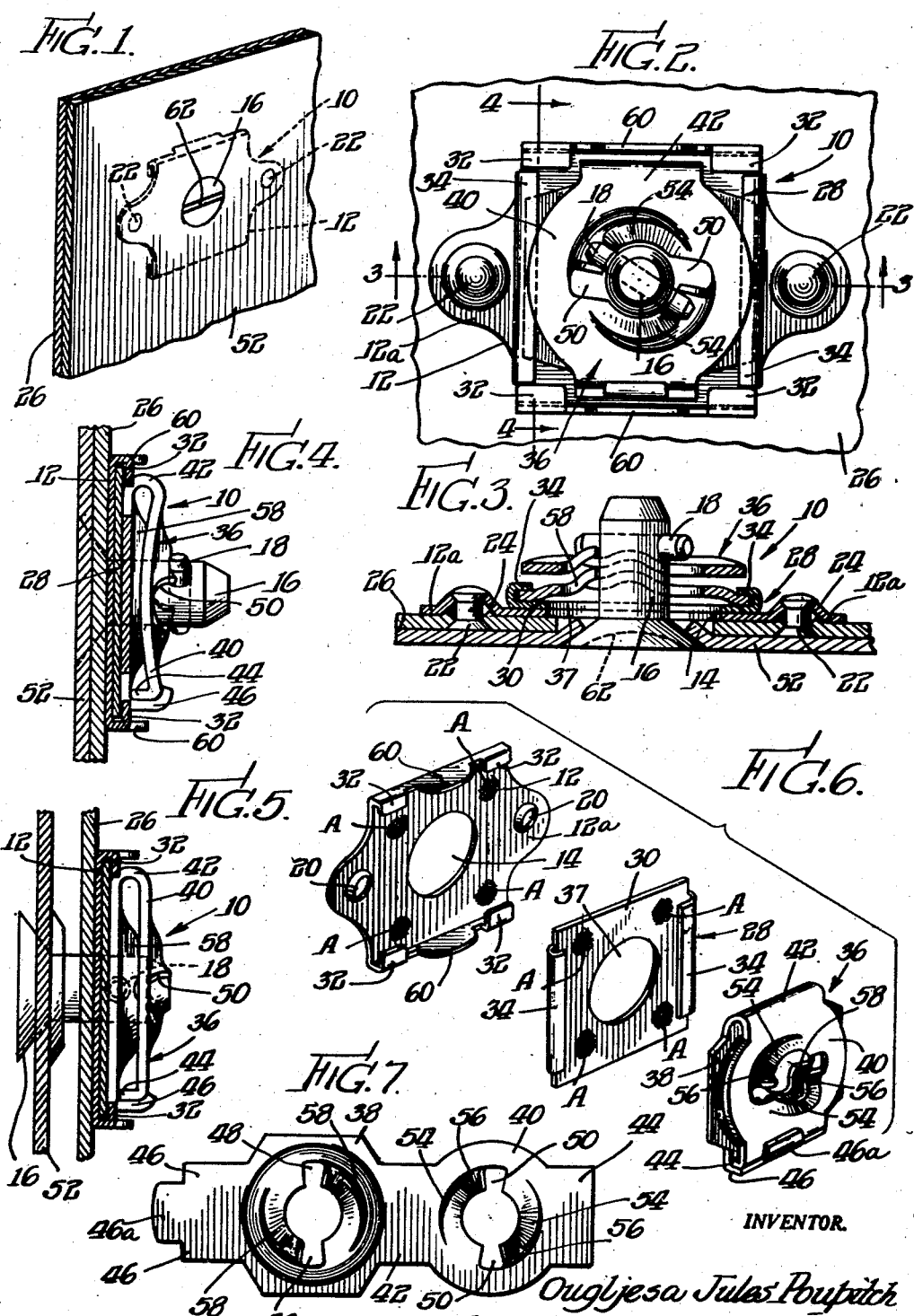
INVENTOR.
Ougljesa Jules Poupitch Patented Jan. 14, 1947

2,414,272

UNITED STATES PATENT OFFICE 2,414,272

FASTENING DEVICE

Ougljesa Jules Poupitch, Chicago, Ill., assignor to Illinois Tool Works, Chicago, Ill., a corporation of Illinois Application March 25, 1943, Serial No. 480,483

8 Claims. (Cl. 24—221)

This invention relates generally to stud fastening devices and more particularly to a stud fastening device in which a stud engaging or locking portion thereof is shiftable with respect to a supporting base so as to facilitate initial registration of a fastening stud member.

It has been common practice to use fastening devices such as cowl fasteners and the like for securing sheet members together. For example, in aircraft construction cowling parts must be arranged so as to enable the convenient attachment and removal thereof. This is only one example of many instances where a series of stud members carried by one of the work parts must be brought into registration with a complementary series of stud fastening devices carried by the other work part in order to secure such parts in fixed relation. It is not uncommon in such instances to experience difficulties in effecting the simultaneous registration of the stud members and complementary fasteners. It is therefore an important object of the present invention to provide a fastener device in which the stud receiving portion of the fastener may be shifted within certain limits and thereby positively assure initial registration of a complementary stud member therewith.

More specifically the invention contemplates a fastening device in which the stud engaging or locking portion may be shifted in transverse directions to bring about the registration of an aperture with respect to a companion stud member.

It is a further object of the present invention to provide a stud receiving fastener device as set forth above which is not only capable of withstanding the most severe stresses to which such devices are normally subjected in the field, but which is also capable of being economically produced by a number of relatively inexpensive forming and stamping operations. To this end it is proposed to provide a fastener in which at least certain of the parts may be formed from sheet stock.

It is still a further object of the present invention to provide a fastener of the type referred to above in which the stud engaging or locking part need not be rotated to effect alignment with a stud member but may be shifted linearly in transverse directions to bring about such alignment or registration.

The foregoing and other objects and advantages will be more apparent from the following detailed description when considered in connection with the accompanying drawing, wherein—

Fig. 1 is a perspective view of two work sheets secured together by means of a fastening device of the type contemplated by the present invention;

Fig. 2 is an enlarged elevational view of the fastening device taken from the rear of Fig. 1;

Fig. 3 is a central transverse sectional view taken substantially along the line 3—3 of Fig. 2;

Fig. 4 is a transverse sectional view of the device taken substantially along the line 4—4 of Fig. 2 disclosing the stud member in its tightened or locked position;

Fig. 5 is a view similar to Fig. 4 disclosing the stud member detached from the stud engaging portion of the fastener with the work pieces slightly separated;

Fig. 6 is an exploded view of the three essential parts of the stud securing fastener, said parts considered from left to right being the base portion, the retainer member and the stud engaging or locking member; and Fig. 7 discloses a blank which may be folded or bent so as to produce the stud locking member illustrated at the right of Fig. 6.

Referring now to the drawing more in detail wherein like numerals have been employed to designate similar parts throughout the various figures, it will be seen that the invention contemplates a stud fastening means or device designated generally by the numeral 10. This device 10 includes a base portion 12 centrally apertured at 14. The diameter of the aperture 14 is sufficient to accommodate a stud member 16 equipped with a cross-pin or lateral lug 18. This base section or plate 12 is provided with oppositely disposed extensions or ears 12a having apertures 20 for accommodating suitable fastening elements such as rivets 22, Figs. 2 and 3. The material of the base extensions 12a in the vicinity of the apertures 20 presents extruded sections 24 which lend strength to the material when tightened by the rivets 22. The base portion or section 12 is designed to be secured to a work piece or plate 26 by means of the rivets 22, as clearly shown. It will be noted in this instance that the work piece 26 is also provided with an aperture which registers with the aperture 14 of the base 12.

Slidably supported upon the base plate or portion 12 is a retainer member designated generally by the numeral 28. In the disclosed embodiment the retainer member or plate 28 includes a plate section 30, the opposite extremities of which are secured against separation from the base plate 12 by means of flange members 32. The opposite sides of the plate 30 are formed with flange members 34 and serve to guide and prevent separation from the retainer 28 of a stud engaging or locking section designated generally by the numeral 36. A central aperture 37 is provided in the plate 30 for accommodating the locking stud 16. The extruded portions 24 surrounding the rivet apertures 20 serve to limit the linear movement in opposite directions of the retainer member 30, and in addition the flange members sufficiently overlap the plate 30 to provide limiting abutments for the stud locking member 36 about to be described.

The stud locking member 36 includes a base section 38, oppositely disposed margins of which are slidably guided within the flanges 34 of the retainer 28. Formed integral with and superimposing the base 38 is a resilient stud locking section 40. At one margin the locking section 40 is supported in spaced relation with respect to the base section 38 by an integral connecting section 42. The opposite margin of the locking section 40 is maintained in spaced relation with respect to the base section or plate 38 by means of overlapping marginal sections 44 and 46. A flap 46a forming an extension of flange 46 overlaps the locking section 40 sufficiently so as to prevent outward displacement of the locking section with respect to the underlying base portion 38. Both the base section 30 and the locking section 40 are centrally apertured to accommodate the locking stud 16. Radial slots 48 of the base section 38 and registering radial slots 50 of the locking section serve to accommodate the cross-pin 18.

Attention is directed to the fact that the stud 16 is carried by a work sheet 52. As the stud carried by the work sheet 52 is telescopically associated with the apertures 14 and 37 and ultimately with the radial slots 48 and 50, the cross-pin 18 is in position to lockingly engage companion cam sections 54. These cams 54 are preferably embossed or extruded from the stock of the locking section 40 and as the stud 16 is rotated in a counterclockwise direction as viewed in Fig. 2, the opposite extremities of the cross-pin 18 move along the rising cam surface, thereby springing the locking section 40 toward its base section 38, as clearly illustrated in Fig. 4. The cross-pin ultimately comes to rest in a locking detent 56 associated with each cam. When the stud is turned to this position the two work plates or sheets 26 and 52 are firmly secured together through the resilient co-action of the locking section 40 with the cross-pin of the stud member. To counteract any tendency for the cam sections 54 to collapse or flatten due to the pressure exerted thereagainst, as well as to limit the degree of movement between the locking section 40 and the base plate 38, the plate 38 is extruded at 58 to provide a support for the cams. These extruded portions 58 lie immediately beneath and conform substantially in contour with the under surface of the cams 54.

Particular attention is directed to the fact that the stud engaging or locking section 36 is linearly shiftable beneath the parallel flanges 34 of the retainer plate 30. This linear movement is limited by flanges or abutments 60 formed integral with and extending outwardly from the base plate 12.

It will be apparent from the foregoing description that the retainer means or plate 30 is shiftable to a limited extent in opposite directions upon the base plate 12, and that the stud engaging or locking member 36 is linearly shiftable in opposite directions within certain limits in directions transverse to the direction of shifting of the retainer plate 30 with respect to the plate 12. In other words, the retainer plate 30 is linearly shiftable with respect to the base plate 12 along one given path and consequently the stud locking section 36 which moves as a unit with the retainer 28 is likewise shiftable along said path. To obtain movement of the section 36 in a transverse direction, said section 36 is shiftable upon the retainer plate 30 between the abutments 60. Thus, while the retainer 28 is shiftable in opposite directions along one path the stud locking section 36 experiences a combined transverse movement in opposite directions which enables the central recess thereof to be adjusted to accommodate varying positions of the stud member 16 within predetermined limits. By having the retainer means 28 shiftable linearly in one direction and the stud locking section shiftable linearly in a transverse direction, adjustment of the aperture in the section 36 to accommodate eccentrically positioned studs is accomplished without subjecting the section 36 to any angular displacement such as rotation. Hence, when the entering extremity of the stud member registers with the central aperture of the locking section 36 the cross pin of the stud must occupy the same angular position with respect to the fastener in order to register with the radial slots 48—50 regardless of the position to which the locking section 36 may have been shifted to accommodate the stud. This would not be true, however, if the slots 48—50 experienced rotary movement whenever the locking section 36 was shifted.

The importance of the predetermined angular positioning of the cross pin will be more readily appreciated when it is understood that in many applications the extremity of the stud which carries the cross pin is completely hidden from view when the work piece such as the sheet 52 is to be attached. Likewise, the fastener 10 is hidden from view beneath the surface of the other work piece or sheet 26. It is common practice in the use of fastening devices of the type herein described to have the screw driver accommodating slot in the stud head and the cross pin of the stud maintain a predetermined angular relationship with each other about the axis of the stud. By having this arrangement the screw slots all occupy the same position when the work piece 52 is fastened to the work piece 26. After a cowling part, for example, has been secured upon its supporting frame structure, the screw driver slots (see slot 62, Fig. 1) should all extend in the same direction. It has been the practice in structures such as airplanes where a series of fasteners are employed at spaced intervals along a given line to so position the fasteners that when the studs are tightened into final position all of the slots in the heads of the studs will be positioned in alignment. With this arrangement an unsecured stud may be immediately identified by the misalignment of its slot with respect to the remaining stud members.

In some instances it may be advisable to roughen, as for example by knurling or other surface treatment, portions of the contacting surfaces of the three parts described above. In Fig. 6 roughened or knurled areas have been shown which are indicated by the letter A. These portions A may be provided on both sides of the retainer plate 28, on the top portion of the base plate 12 and along the bottom surface of the stud engaging member 36. When the parts are finally secured in position these roughened areas provide an effective interlock between the parts so as to prevent relative shifting or slippage. The contacting surfaces could be treated in other ways to provide increased frictional engagement of the parts when they are clamped together. It will suffice to say that the invention contemplates treatment of the surfaces to bring about the desired result.

The present invention contemplates a self-aligning fastener of extremely practical construction. While the invention is not limited to the use of sheet metal parts for all of the constituent elements it has been found practical to use sheet metal in most instances. Simple forming and stamping operations may be practiced in the manufacture of the device. In the disclosed embodiment limited movement of the retainer means 28 is accomplished by the use of two abutment elements, to-wit, the flanges 32 which are adapted to be engaged by adjacent margins of the screw locking device 36 and the extruded portions 24 of the base 12 surrounding the rivet receiving apertures 20. In some instances it may be desirable to use only the extruded portions as abutments for limiting the movement of the retainer means 28 in which case it would be unnecessary for the flanges 32 to overlap the opposite margins of the member 36. The floating mounting of the retainer 38 on the base plate 12 and the floating mounting of the stud locking member 36 on the retainer means 28 present a very practical solution of the problem of effecting automatic alignment or registration with stud members.

While for purposes of illustration particular structural embodiments of both the stud member and the locking device therefor have been shown, it should be understood that the invention contemplates the use of other stud and stud locking structural features. The invention should be limited only by the scope of the appended claims.

The invention is hereby claimed as follows:

1. A fastening device for accommodating a fastening stud member including an apertured base portion adapted to be secured to a part to be fastened, retainer means operatively associated with said base portion and shiftable with respect thereto in given opposite directions to a limited extent, stud engaging means operatively associated with said retainer means and shiftable with respect thereto in given opposite directions transversely with respect to the aforesaid opposite directions of movement of said retainer means, and means for limiting the extent of movement of said stud engaging means, the aforesaid limited shifting of the parts serving to facilitate initial registration therewith of said fastening stud member.

2. A fastening device as set forth in claim 1 wherein the stud engaging means comprises a spring member adapted to yield toward the base portion when the stud member is secured in position.

3. A fastening device as set forth in claim 1 wherein the stud engaging means comprises a spring member provided with cam means for receiving the lateral lug of a stud member.

4. A fastening device as set forth in claim 1 wherein the retainer means and the stud engaging means are limited to linear movement in opposite directions.

5. A fastening device for accommodating a stud member including an apertured base portion of sheet material adapted to be secured to a part to be fastened, retainer means operatively associated with said base portion and shiftable with respect thereto in given opposite directions to a limited extent within a plane parallel to the plane of the base, stud engaging means operatively associated with said retainer means and shiftable with respect thereto in given opposite directions within a plane parallel to said base and transversely with respect to the aforesaid opposite directions of movement of said retainer means, and means for limiting the extent of movement of said stud engaging means, the aforesaid limited shifting of the parts serving to facilitate initial registration therewith of said fastening stud member.

6. A fastening device for accommodating a fastening stud member including an apertured base portion of sheet material adapted to be secured to a part to be fastened, a retainer plate adjacent said base portion and shiftable parallel thereto in given opposite directions to a limited extent, stud engaging means operatively associated with said retainer means and shiftable parallel thereto in given opposite directions transversely with respect to the aforesaid opposite directions of movement of said retainer means, and means for limiting the extent of movement of said stud engaging means, the aforesaid limited shifting of the parts serving to facilitate initial registration therewith of said fastening stud member.

7. A fastening device for accommodating a fastening stud member including an apertured base portion adapted to be secured to a part to be fastened, a retainer plate operatively associated with said base portion and shiftable with respect thereto in a given direction to a limited extent, stud engaging means operatively associated with said retainer means and shiftable with respect thereto in a given direction transversely with respect to the aforesaid direction of movement of said retainer means, and flange means for limiting the extent of movement of said stud engaging means, the aforesaid limited shifting of the parts serving to facilitate initial registration therewith of said fastening stud member.

8. A fastening device for accommodating a fastening stud member as set forth in claim 5 wherein contacting surface areas of the constituent parts coact to prevent slippage between said parts when the fastening device is clamped in position.

OUGLJESA JULES POUPITCH.